(12) United States Patent
Scogin et al.

(10) Patent No.: US 7,495,777 B2
(45) Date of Patent: Feb. 24, 2009

(54) METHOD AND APPARATUS FOR CONTACT FREE MEASUREMENT OF PERIODICALLY MOVING OBJECTS

(75) Inventors: James Scogin, Austin, TX (US); Brian Crowell, Austin, TX (US); Ron Lutz, Austin, TX (US)

(73) Assignee: Tyrex Services Group Ltd., Austin, TX (US)

( * ) Notice: Subject to any disclaimer, the term of this patent is extended or adjusted under 35 U.S.C. 154(b) by 0 days.

(21) Appl. No.: 11/500,715

(22) Filed: Aug. 8, 2006

(65) Prior Publication Data

US 2008/0037032 A1 Feb. 14, 2008

(51) Int. Cl.
*G01B 11/24* (2006.01)
(52) U.S. Cl. .................... 356/601; 356/613; 356/625
(58) Field of Classification Search .......... 356/625, 356/613, 601–604
See application file for complete search history.

(56) References Cited

U.S. PATENT DOCUMENTS

| 6,611,343 B1 * | 8/2003 | Frankowski ............ 356/601 |
| 6,817,528 B2 | 11/2004 | Chen |
| 6,909,514 B2 | 6/2005 | Nayebi |
| 2002/0041368 A1 * | 4/2002 | Ota et al. ............ 356/400 |
| 2003/0103216 A1 | 6/2003 | Gomez et al. |

FOREIGN PATENT DOCUMENTS

JP 11211443 * 6/1999

OTHER PUBLICATIONS

Barrientos B, and Cywiak, M.; "Measurement of dynamic deformation using a superrimposed grating". Revista Mexicana Fisica 50(1) 12-18.

* cited by examiner

*Primary Examiner*—L. G Lauchman
*Assistant Examiner*—Iyabo S Alli
(74) *Attorney, Agent, or Firm*—Michael Ervin; M.A. Ervin & Associates

(57) ABSTRACT

A method and apparatus is described for contact-free 3 dimensional-measuring of a moving object with periodic motion. The method and apparatus makes use of the projection of a defined intensity pattern onto the moving object and the recording and analysis of a reflected pattern from the object wherein the intensity pattern projection is synchronized to a characteristic periodic frequency period or sub-period of the moving object.

14 Claims, 2 Drawing Sheets

METHOD AND APPARATUS FOR CONTACT FREE MEASUREMENT OF PERIODICALLY MOVING OBJECTS

BACKGROUND OF INVENTION

The field of this invention is that of the use of line-projection procedures to make contact free 3 dimensional measurements of objects. Line-projection procedures are known in the art and have been implemented in optical 3D-measuring technology for several years. These line-projection procedures are also called "structured light". There are procedures using a projection system with fixed line distance and projection systems with variable line distance. Procedures with variable line distance are advantageous to enable coding of the projected image to assist in surface measurement. These line-projection procedures are also called "coded structured light". Somewhat more advanced procedures referred to as phase-code procedures are also used.

Many techniques for 3D measurement using structured light projection for measurement of stationary objects have been developed. All methods of this type project an intensity pattern on the test object and record the deformation of the pattern induced by the shape of the object as observed from an angle offset from the illumination direction. The object shape may then be derived from the observed pattern. One or more projection/record cycles are required depending upon the measurement technique. Multiple projection/record cycles are commonly required by measurement techniques employing projection patterns with varying phase or other variation to produce high quality measurements. Another common method is use of multiple projection cycles to produce varying intensity levels. The elapsed time for each projection/record cycle limits the application of the technique to objects stationary during the projection/record cycles.

The measuring results and information attainable with the line-projection procedure, in connection with the optical and microscopic systems used, largely depend on the quality of the projected lines. For numerous technical measuring applications it is necessary to generate not only bicolor modulated lines (black/white structures) with rectangular intensity structures, but also gray scale phase-modulated lines with a defined sinusoidal intensity structure to be projected onto the object during the same measuring cycle.

Frankowski (U.S. Pat. No. 6,611,343) presented an approach to provide the defined intensity patterns needed through use of a micro-mirror projector. Through creation and projection of the line intensities with a micro-mirror projector, where a large number of individually computer controlled micro-mirror sections are arranged on a carrier, defined intensity structures can be created in strip and line patterns commonly used in 3D-measuring technology, but also in sinusoidal modulation within an extremely short time frame within the recording cycle. It is also possible to create geometric intensity structures adapted to the 3D-profile of the object, such as circles, dots, cross shapes, ellipses, rectangles, and others. Their interference with the object geometry ensures a highly precise computerized recording of the 3D-profile of the object, the intensity structures created with this invention having a high contrast, resulting in a definite increase in measuring precision, performance, and information attainable with the 3D-measuring technology. In addition laser speckle and statistical noise patterns can be generated using this approach.

The elapsed time for each projection/record cycle limits the application of the technique to objects stationary during the projection/record cycles. There are a growing number of applications however where the object to be measured is not stationary. There is a need then for using these defined intensity projection techniques for objects that in operation exhibit periodic motion such as rotation or oscillation. Periodic meaning in this case that the objects being measured are moving in repeated cycles.

BRIEF SUMMARY OF INVENTION

The unmet need then is the special case when an object to be measured exhibits periodic motion such as, for example, rotation or oscillation. This periodic motion allows the measurement cycles to be distributed over multiple cycles of repetitive motion resulting in a procedure and device that can measure moving objects.

An object that is, for example, rotating in a repetitive cycle will have a characteristic frequency of rotation. Similarly an object that is oscillating will do so in a characteristic frequency of oscillation.

An aspect of the instant invention is thus a defined intensity pattern projection system that is synchronized to a periodically moving object such that one projection/record cycle is completed each period, with N periods required to complete the measurement.

Another aspect of the instant invention is a defined intensity pattern projection system that makes multiple measurements during each period at sub period values of the characteristic frequency in a 3D profile versus phase measurement. Single image capture or video capture may be used if the frame capture can be synchronized to the same phase in each cycle.

The invention can be realized by a method for contact-free 3 dimensional-measuring of a moving object with periodic motion, including at least the steps of: projecting arbitrary intensity patterns onto a moving object to create a deflected projected pattern corresponding to the shape of the moving object; recording the deflected projection pattern with a camera; and evaluating with a computer supported software evaluation protocol the created deflected projection pattern corresponding to the shape of the moving object; wherein the projecting of arbitrary intensity patterns onto the moving object is synchronized to a characteristic periodic frequency period or sub-period of the moving object.

The invention can also be realized by an apparatus for execution of the method comprising: a projector for projecting defined intensity patterns onto the moving object to create deflected projected patterns corresponding to the shape of the moving object; a camera for recording the deflected projection patterns; a measuring and control computer for receiving a characteristic frequency of the moving object, sending control signals to the projector system to project the defined intensity patterns at regular periods or sub-periods of the characteristic frequency; an evaluation protocol software program that accepts the digital data from the recorded deflected projection patterns and determines pre-defined characteristics of the moving object.

DETAILED DESCRIPTION OF THE INVENTION

Figure 1:
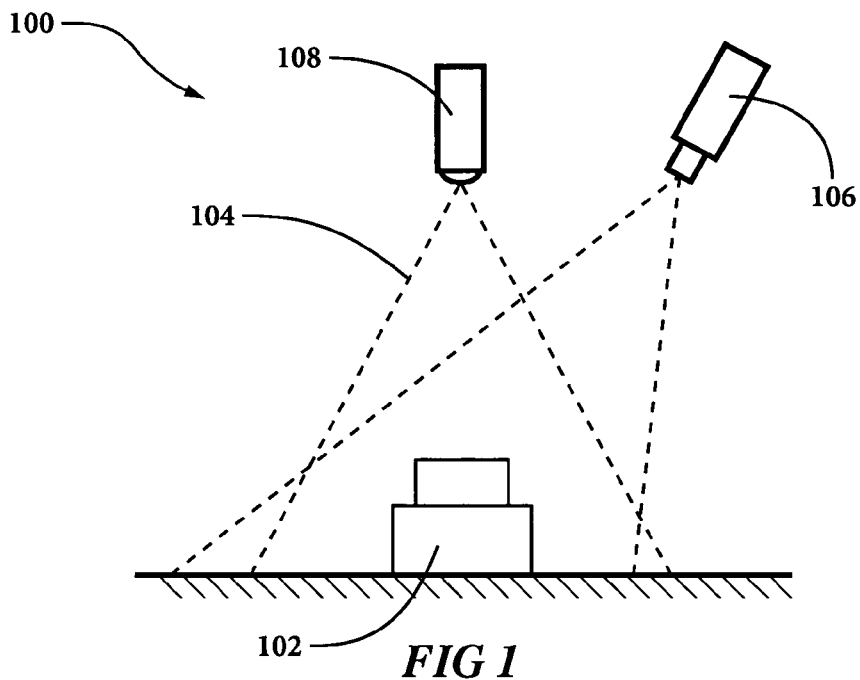
FIG. 1 illustrates a general prior art fringe projection system.

Various techniques have been proposed for measuring three-dimensional shapes by optical techniques. FIG. 1, illustrated generally by the numeral 100, shows a technique that has been shown to have high potential. This methodology is often called full-field triangulation. An object 102 has an intensity pattern 104 projected onto it by a projector 108. The pattern is projected at an angle of incidence that differs from the imaging direction. The object is imaged into a camera 106. There is a virtual shift between the patterns projected at different heights of object 102. A common technique, referred to as phase-code technique, is implemented by projecting a series of P fringe patterns $I_{project}(m)$ (m=1 ... P) with sinusoidal intensity profile of a given synthetic wavelength and a specific mutal phase shift. The camera will see these fringes with some distortion due to the surface profile of object 102. The net result is that the height differences of object 102 are encoded in the recorded pattern series $I_{record}(m)$ (m=1 ... P). The captured images can then be fed to a computer supported software algorithm that converts the intensity readings into phase values Nij for each individual pixel (i,j):

$$\Phi_{ij} = \tan^{-1} \frac{\sum_{m=1}^{P} a_m \cdot I_{ij}^{project}(m)}{\sum_{m=1}^{P} b_m \cdot I_{ij}^{project}(m)} + N \cdot 2\pi$$

The coefficients am and bm depend upon the actual phase shift procedure that is applied and there is a wide variety of solutions described in the literature. The corresponding coefficients are:

$a_m = \cos(2\pi/P \cdot (m-1))$ $b_m = \sin(2\pi/P \cdot (m-1))$

It should be recognized that this phase-code approach is not the only practical solution and other approaches are used such as intensity based coded structured light sequences for the purpose of fringe counting. The instant invention anticipates the use of any of these methodologies.

Projector 108 can take several forms. Projection procedures often use LCD (liquid crystal display) displays to project structured light patterns through computer control of the lines or columns of the LCD display working with various lighting modes. It is also possible to project structured light onto an object using different structures fixed onto a carrier. Structured light patterns can also be projected on objects by use of grid plates being moved in the beam channel of a light projector. Finally structured light can be created and projected using micro-mirror projectors, where a large number of individually computer controlled micro mirror sections are arranged on a carrier. The instant invention anticipates the use of any of these approaches.

Figure 2:
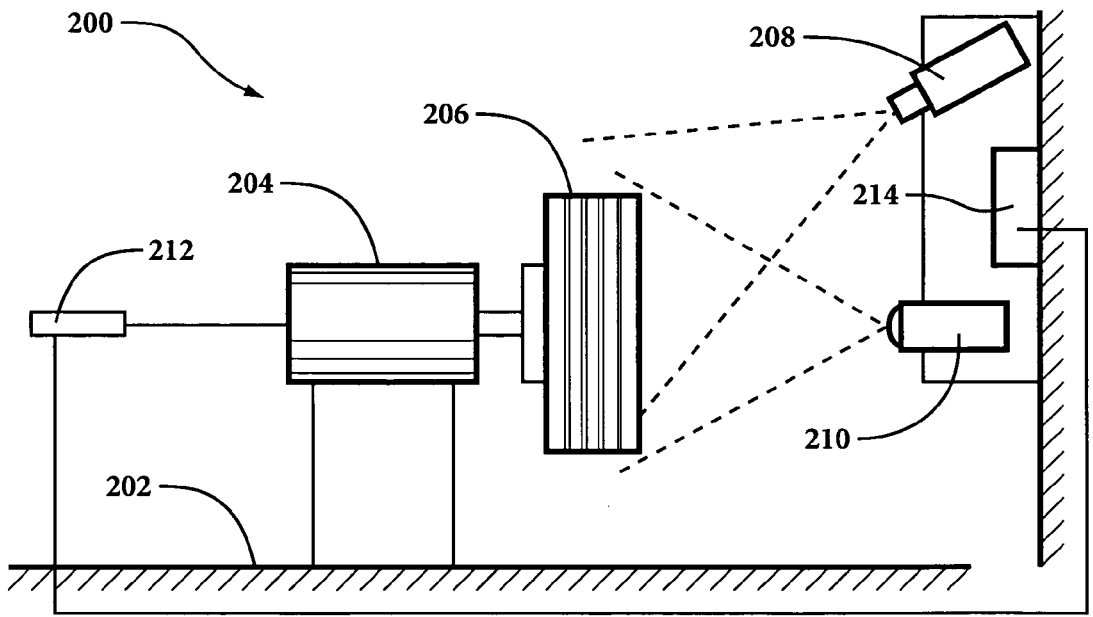
FIG. 2 illustrates a test stand system for using the instant invention.

FIG. 2, shown generally as the numeral 200, illustrates an aspect of the instant invention. Some objects for measurement are not stationary. In particular there are applications in which the object to be measured is moving in a regular periodic pattern. The example shown in FIG. 2 is the aspect of measuring a rotating object of any kind. Almost every machine requires rotating parts for proper functioning: To improve the design regarding fatigue, life time, reliability, sound radiation, wear and tear and tolerances, as well as the measurement of temperature or flow distribution, continuous measurements of rotating components are necessary. Often, such measurements are very difficult to perform; sometimes it is not feasible at all. This is especially true when three-dimensional measurement is desired.

A test bench 202 is shown containing a motor 204 turning a part 206. The part could be a flexible material that deforms during rotation and it is desired to measure that deformation. A fringe pattern projection system 210, coupled with a camera imaging system 208, is positioned to project intensity patterns at an angle of incidence that differs from the imaging direction. The reflected intensity patterns from the object are imaged into a camera 208. Attached to motor 204 is a speed encoder 212, which feeds a signal to control computer 214. An important aspect of the instant invention is the use of the encoder signal to synchronize the imaging of the reflected intensity patterns to the characteristic frequency of the periodically moving object. This technique may be extended to any object displaying any type of periodic motion. Another example (not shown) might be the measurement of the deflection of a speaker diaphragm during operation. In this case the speaker diaphragm might be pulsed in a regular periodic motion and then that characteristic frequency would be used to synchronize the imaging of the reflected intensity patterns to the characteristic frequency of the diaphragm.

For example a complete measuring cycle requiring N projection/record periods could be synchronized to a periodically moving object such that one projection/record is completed each period, with N periods required to complete the measurement. The resulting measurement will be accurate assuming the object shape repeats at the same period each rotation and the period speed relative to the projection/record time does not cause significant distortion. During each of these projection/record periods the projector can project one or more images and the camera records one image. The recording may integrate one or more projected images and these can be combined to produce a combined image.

Figure 3:
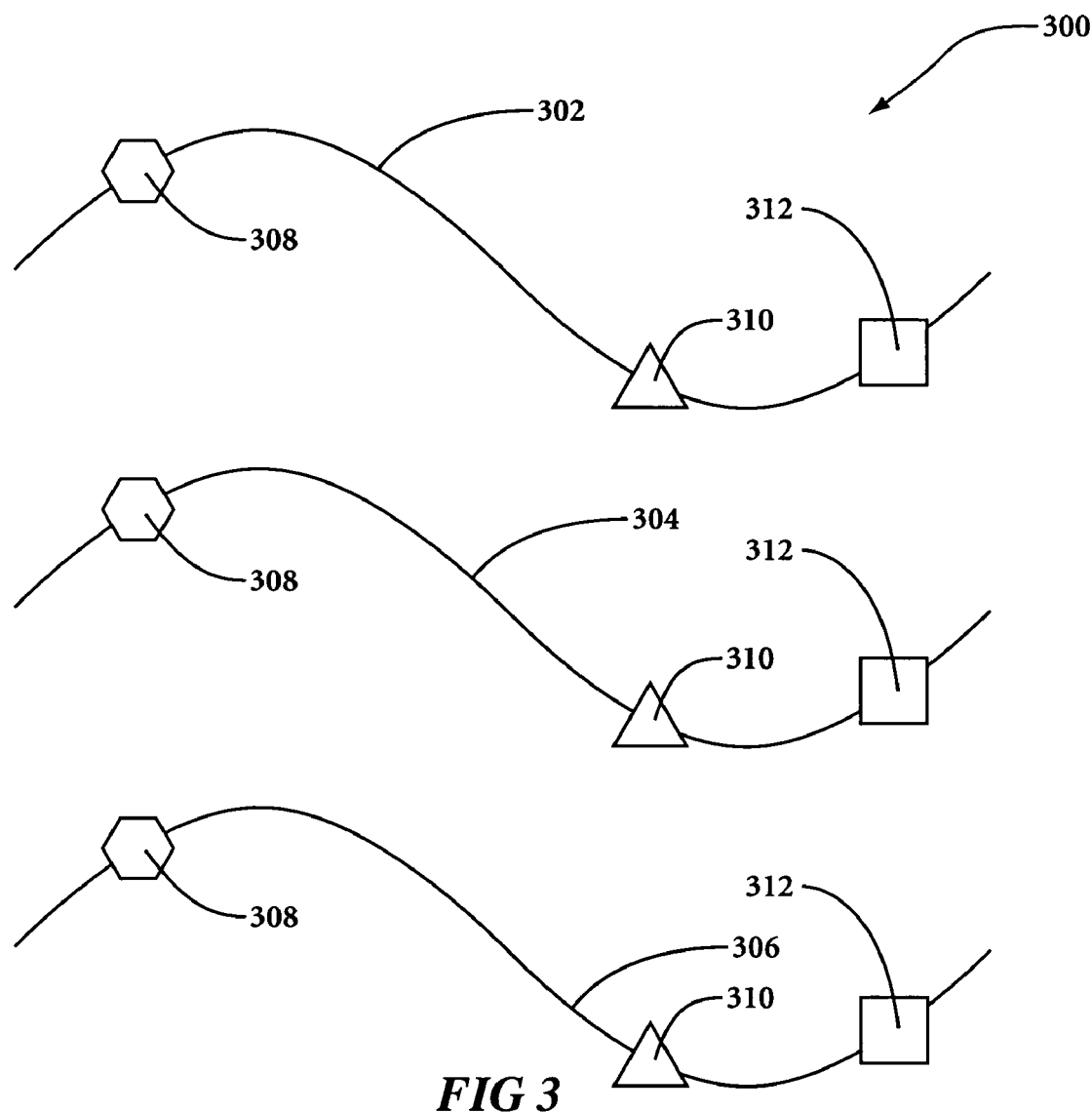
FIG. 3 is a schematic illustrating an overall measuring cycle with multiple projection/record periods with sub-period recording cycles.

This technique may be extended to make multiple measurements each period at different sub-period values resulting in a 3D profile versus sub-period measurement. FIG. 3 illustrates a measuring cycle consisting of N projection/record periods. Each projection/record period 302, 304, 306 also has sub-periods 308, 310, 312 which represent chosen sub-periods within the periodic motion in which it is desired to record measurement data. Single image capture or video capture may be used if the frame capture can be synchronized to the same sub-period in each period.

A device for this invention would thus accept a synchronization signal from the test object such as a tachometer signal from a rotating object, a drive signal from an electromechanical object, or any sensor providing synchronization to the test object motion. The measurement device would then devise the best test method based upon the measurement methodology, operator specified test parameters and the frequency of the synchronization signal. The device would then generate the required pattern sequence, control pattern display and record the reflection synchronously with the test object. The device would compute the 3D point cloud for each measured sub-period value as the test is performed or after the test is complete.

The collected data from each individual sub-period is evaluated independently of the data from other sub-period values. Data from each period for a sub-period may be combined as required by the measurement method to produce a 3D point cloud for the sub-period. This data combination could include integration of the data over several periods to produce the result of intensity modulation. This process is repeated at each sub-period to produce a 3D point cloud at sub-period. The resulting point clouds represent X, Y, Z 3D data vs sub-period for a moving object with periodic motion.

The invention claimed is:

1. A method for contact-free 3 dimensional-measuring of a moving object with periodic motion, comprising the steps of:
   a. projecting a defined intensity pattern onto said moving object to create a deflected projected pattern corresponding to the shape of said moving object;
   b. recording said deflected projection pattern with a camera; and
   c. evaluating with a computer supported software evaluation protocol the created deflected projection pattern corresponding to the shape of said moving object;
   wherein said projecting of defined intensity patterns onto said moving object is synchronized to a characteristic periodic frequency period or sub-period of said moving object.

2. A method according to claim 1, defined by the intensity patterns being projected onto an object in a measuring cycle with differing intensity patterns and at varying structure distances between adjoining patterns.

3. A method according to claim 2, wherein said projected intensity patterns have a rectangular intensity modulation.

4. A method according to claim 2, wherein said projected intensity patterns are modulated in a sinusoidal shape.

5. A method according to claim 2, wherein said projected intensity patterns are modulated dot-shaped, circular, or elliptical.

6. A method according to claim 2, wherein said projected intensity patterns have a cross-shaped pattern.

7. A method according to claim 2, wherein said projected intensity patterns have a speckled pattern.

8. A method according to claim 2, wherein said the projected intensity patterns have a statistical noise structure.

9. An apparatus for execution of the method according to claim 1, comprising:
   a. a projector for projecting defined intensity patterns onto said moving object to create deflected projected patterns corresponding to the shape of said moving object;
   b. a camera for recording said deflected projection patterns;
   c. a measuring and control computer for receiving a characteristic periodic frequency of said moving object, sending control signals to said projector system to project said defined intensity patterns at regular periods or subperiods of said characteristic periodic frequency;
   d. an evaluation protocol software program that accepts the digital data from said recorded deflected projection patterns and determines pre-defined characteristics of said moving object.

10. An apparatus according to claim 9 wherein said pre-defined characteristics comprise the configuration (shape) of said moving object.

11. An apparatus according to claim 9 wherein said pre-defined characteristics comprise the object dimensions of said moving object.

12. An apparatus according to claim 9 wherein said pre-defined characteristics comprise the surface condition of said moving object.

13. An apparatus according to claim 9 wherein said projector is a micro-mirror projector.

14. An apparatus according to claim 9 wherein said projector is a liquid crystal display projector.

* * * * *